United States Patent
Goldner et al.

(10) Patent No.: US 6,496,264 B1
(45) Date of Patent: Dec. 17, 2002

(54) FIBER OPTIC ACOUSTIC SENSOR WITH SPECIFICALLY SELECTED FLEXURAL DISKS

(75) Inventors: Eric Lee Goldner, Valencia, CA (US); Michael J. Tweedy, Simi Valley, CA (US); Samuel N. Fersht, Studio City, CA (US); David B. Hall, La Crescenta, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 83 days.

(21) Appl. No.: 09/696,673

(22) Filed: Oct. 25, 2000

Related U.S. Application Data

(60) Provisional application No. 60/220,524, filed on Jul. 24, 2000.

(51) Int. Cl.[7] .................................................. G01B 9/02
(52) U.S. Cl. ..................................... 356/478; 73/514.01
(58) Field of Search ................................. 356/478, 477, 356/483; 250/227.19, 227.27; 73/514.01; 367/149

(56) References Cited

U.S. PATENT DOCUMENTS

| | | | |
|---|---|---|---|
| 4,959,539 A | | 9/1990 | Hofler et al. |
| 4,986,624 A | | 1/1991 | Sorin et al. |
| 5,155,548 A | * | 10/1992 | Danver et al. ............... 356/478 |
| 5,253,222 A | * | 10/1993 | Danver et al. .......... 250/227.19 |
| 5,285,424 A | * | 2/1994 | Meyer ......................... 356/477 |
| 5,317,929 A | | 6/1994 | Brown et al. |
| 5,369,485 A | | 11/1994 | Hofler et al. |
| 5,883,308 A | | 3/1999 | Fersht |
| 5,903,949 A | | 5/1999 | Vohra et al. |

* cited by examiner

*Primary Examiner*—Samuel A. Turner
(74) *Attorney, Agent, or Firm*—Lynn & Lynn

(57) ABSTRACT

A displacement sensor and an acceleration sensor are mounted to a common support member. The displacement sensor comprises a first circular flexural disk having a natural frequency less than the frequency range of the acoustic waves of interest. Spiral-wound optical fiber coils are mounted to opposite sides of the first flexural disk. The acceleration sensor comprises a second flexural disk having a natural frequency greater than the frequency range of the acoustic waves. Spiral-wound optical fiber coils are mounted to opposite sides of the second flexural disk. A fiber optic interferometer provides an output signal that is a combination of signals output from the displacement sensor and the acceleration sensor. The displacement sensor includes an inertia ring mounted to an edge of the first flexural disk to keep it nearly stationary when an acoustic wave in the selected frequency range is incident upon the housing. The flexural disks include upper and lower rings spaced apart from the support post with portions of the disks between the rings and the support post defining hinges at which the flexural disk flex in response to acceleration of the support member along its longitudinal axis. The surfaces of the first and second flexural disks preferably include grooves extending between the upper rings and the outer edges of the flexural disks. The grooves are arranged to allow lengths of optical fiber adjacent the rings to pass under the optical fiber coils that are formed on the surfaces of the flexural disks.

25 Claims, 11 Drawing Sheets

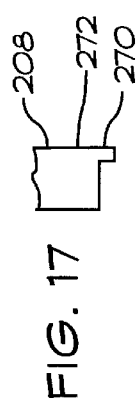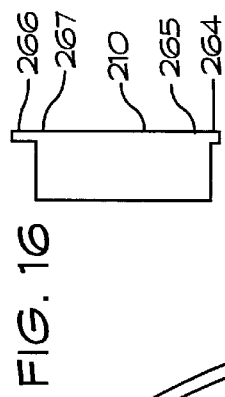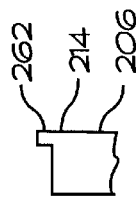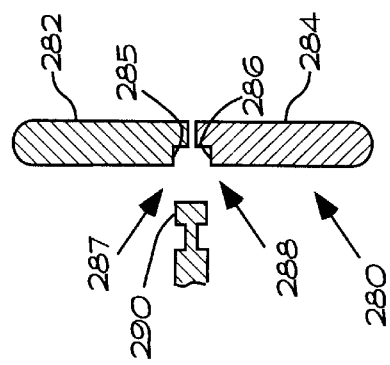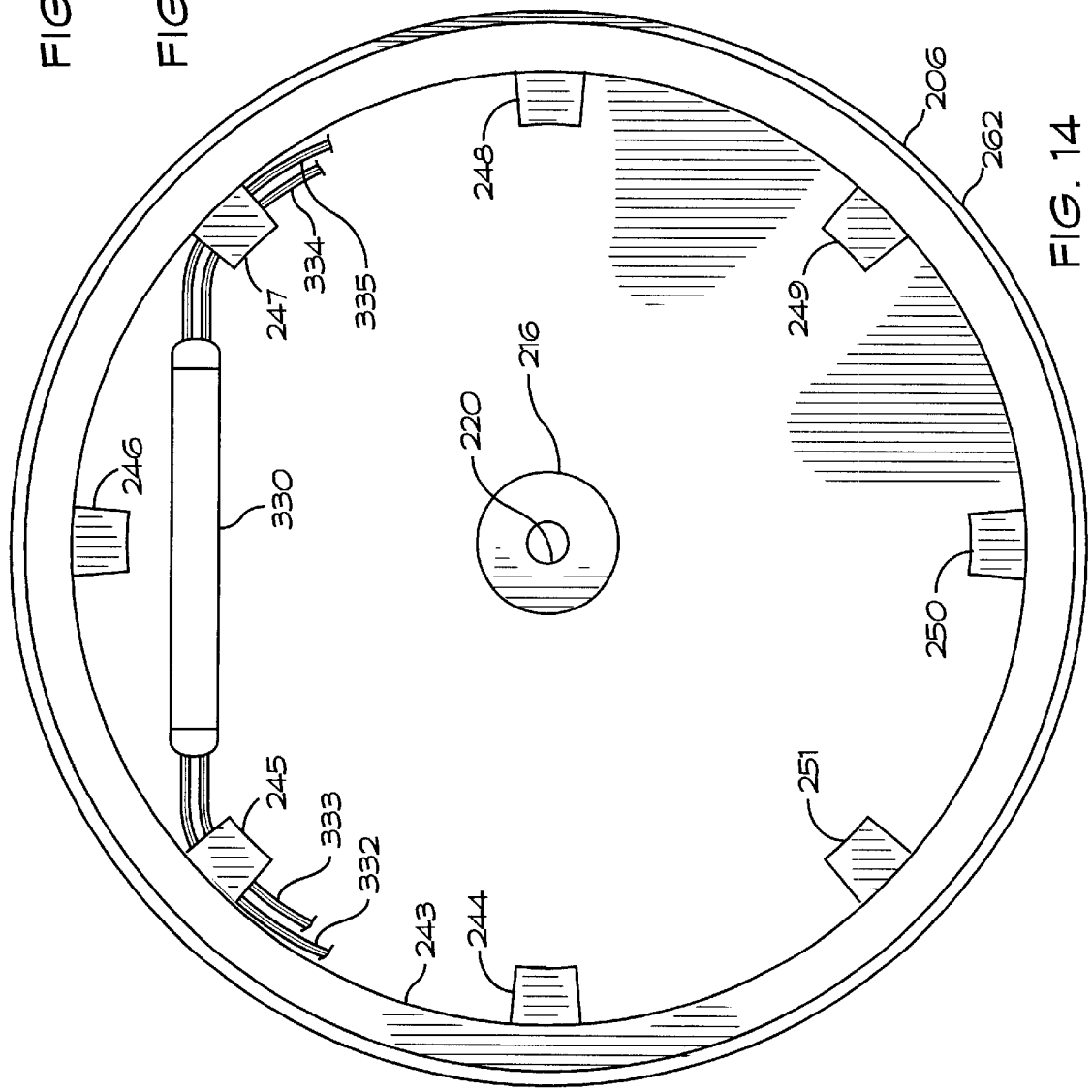

FIBER OPTIC ACOUSTIC SENSOR WITH SPECIFICALLY SELECTED FLEXURAL DISKS

CROSS REFERENCE TO RELATED APPLICATION

Applicants claim the benefit of U.S. Provisional Application Ser. No. 60/220,524, filed Jul. 24, 2000 for Broadband Acoustic Sensor.

BACKGROUND OF THE INVENTION

This invention relates generally to fiber optic particle motion sensors used for detecting acoustic signals. In particular, this invention relates to a single fiber optic acoustic sensor that combines the low frequency response characteristics of a displacement sensor with the high frequency response characteristics of an accelerometer.

Prior fiber optic particle motion sensor art used for acoustic sensing can be classified in two categories: flexural disk accelerometers and flexural disk displacement sensors, each with significant problems. The flexural disk fiber optic accelerometers suffer from a gain-bandwidth limitation that trades off scale factor sensitivity for wider frequency response, dependent on sensor design. Center supported sensors typically have higher gain but lower resonance frequencies, whereas edge supported sensors have the opposite problem. This could be overcome, somewhat by utilizing a fiber optic displacement sensor (seismic sensor), which operates above its resonance. However, these sensors suffer from a weight penalty. To achieve high gain and acceptable bandwidth, displacement sensors need to be large and highly massive.

SUMMARY OF THE INVENTION

This invention is a very broad band fiber optic acoustic sensor system. It combines the low frequency response of a displacement sensor and the high frequency response of an accelerometer in a single sensor system. This approach yields a high gain-bandwidth product sensor system without the need for large, massive sensors.

An acoustic sensor system according to the present invention for measuring parameters of acoustic waves in a selected frequency range comprises a displacement sensor and an acceleration sensor mounted to a common support member. The displacement sensor comprises a first circular flexural disk assembly having a first natural frequency that is below the frequency range of the acoustic waves of interest. The first flexural disk assembly comprises a first set of upper and lower spiral-wound optical fiber coils that are attached to opposite sides of a first flexural disk. The acceleration sensor comprises a second circular flexural disk assembly having a second natural frequency that is greater than the frequency range of the acoustic waves of interest. The second flexural disk assembly comprises a second set of upper and lower spiral-wound optical fiber coils that are attached to opposite sides of a second flexural disk. A fiber optic interferometer system is arranged to provide an optical output signal that is a combination of signals outputted from the displacement sensor and the acceleration sensor.

The displacement sensor preferably further includes an inertia ring mounted to an edge of the first flexural disk to enhance the sensitivity by maintaining the edge of the first flexural disk nearly stationary when an acoustic wave in the selected frequency range is incident upon the housing. The second advantage of the inertia ring is to further reduce the natural frequency of the displacement flexural disk, which effectively extends the low frequency range, and hence, the bandwidth of the sensor.

The support member preferably includes a base and a bolt extending from the base. Central passages are formed in the first and second flexural disks such that they may be mounted on the bolt. A nut and washer are engaged with the bolt to secure the first and second flexural disks to the base with the aid of an intervening cylindrical spacer.

Mass-spring systems of the type represented by both types of flexural disks exhibit common resonant characteristics. At frequencies far below resonance, the mechanical response is in phase with the forced excitation; i.e., in phase with the acoustic signal acting on the case. At frequencies near resonance, the phase response begins to lag the acoustic signal. At resonance, this lag angle is 90°, and at frequencies much greater than the resonant frequency, the phase response approaches 180° with respect to the acoustic signal. The sensor system's operational band spans frequencies above resonance for the displacement portion of the device (with approximately 180° phase shift) and below resonance for the accelerometer portion (near 0° phase shift). Therefore, the phase response of the two separate sensing elements are therefore approximately 180° apart in the operating region between the two resonant peaks. To allow the individual sensor outputs to be additive for increased scale factor, it is necessary to connect the output of the top coil of the displacement flexural disk to the bottom coil of the accelerometer flexural disk and vice-versa. In a practical sense, this allows the changes in the optical path length of the respective coil windings of both flexural disks to be summed together when both are subjected to a common shortened path length compressive load and conversely, the changes in the optical path length of the opposite coil windings are summed together when subjected to a common elongated path length tensile load. The difference between these two composite path lengths provides the interferometric function that is sensed by the photodetector at the output of the 2×2 coupler.

The interferometer system may alternatively comprise a two-wavelength optical signal source and an optical coupler arranged to receive optical signals outputted from the optical signal source and provide the optical signals into each of the first and second upper optical fiber coils and the first and second lower optical fiber coils. The optical coupler also is arranged to combine optical signals from the first and second upper optical fiber coils and the first and second lower optical fiber coils such that interference between optical signals of a first one of the two wavelengths indicates displacement and interference between optical signals of the other wavelength indicate acceleration. Information from the accelerometer and displacement sensors can be combined electronically, as needed, following demodulation.

Each of the first and second flexural disks preferably includes integrally machined upper and lower rings spaced apart from the support post. The presence of these rings provides a winding hub surface upon which the fiber coil can be directly wound.

The surfaces of the first and second flexural disks preferably include curved grooves extending between the upper or lower rings and the outer edges of the flexural disks. The grooves are arranged to allow lengths of optical fiber adjacent the rings to pass under the optical fiber coils that are formed on the surfaces of the flexural disks, thereby preventing microbend stresses on the fiber while permitting the buried fiber lead to exit the coil tangent to the outer edge of the flexural disk.

An appreciation of the objectives of the present invention and a more complete understanding of its structure and method of operation may be had by studying the following description of the preferred embodiment and by referring to the accompanying drawings.

BRIEF DESCRIPTION OF THE DRAWINGS

FIG. 14 is a top plan view of a lower housing that may be included in the embodiment shown in FIG. 13;

FIG. 15 is a partial cross sectional view. of the lower housing shown in FIG. 14;

FIG. 16 is a partial cross sectional view of a spacer that may be included in the embodiment shown in FIG. 13;

FIG. 17 is a partial cross sectional view of an upper housing that may be included in the embodiment of FIG. 13; and FIG. 18 is a cross sectional view showing how a proof mass is connected to the outer edge of a flexural disk in the apparatus of FIG. 13.

DESCRIPTION OF THE PREFERRED EMBODIMENT

Figure 1:
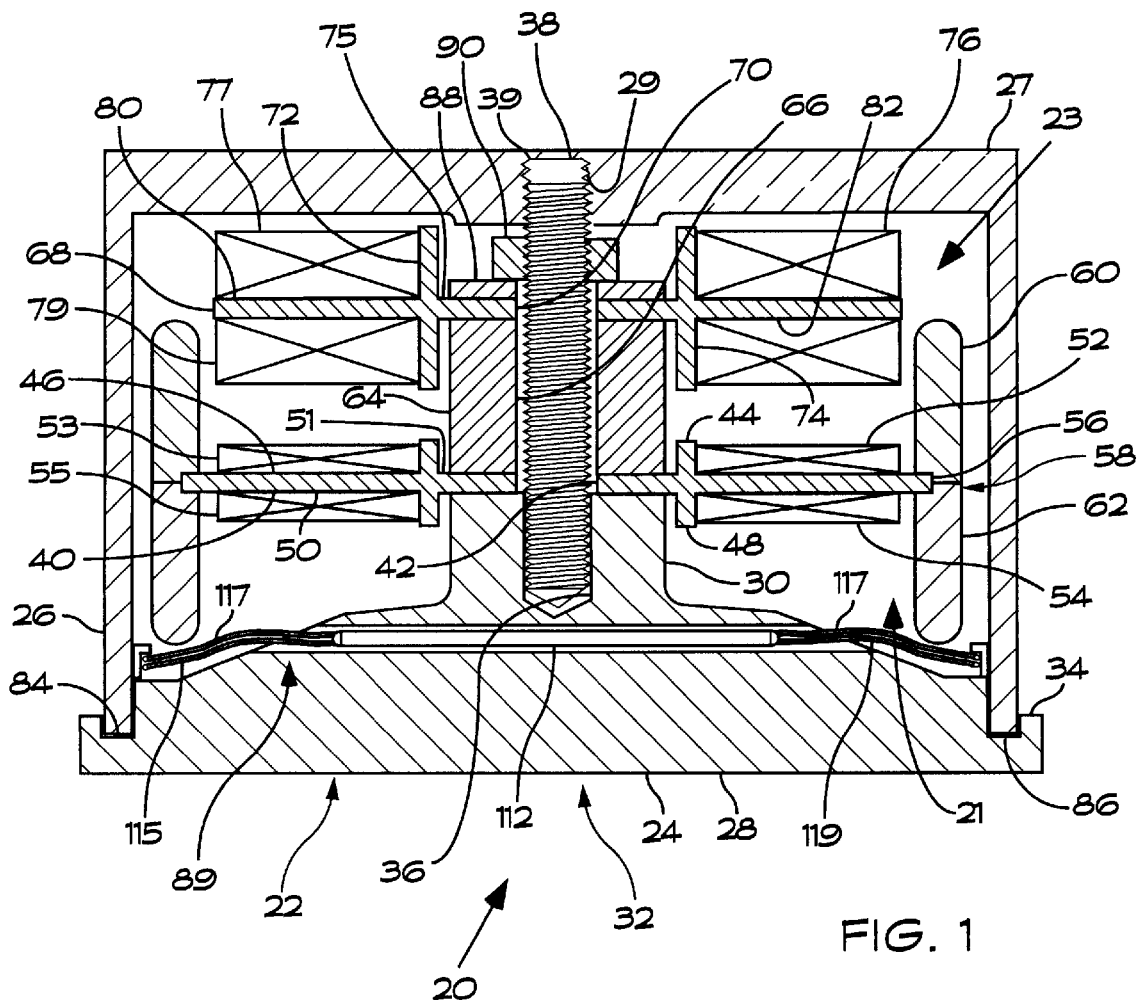
FIG. 1 is a side view cross section of a center-supported fiber optic acoustic sensor according to the present invention showing fiber optic coils mounted on a upper and lower flexural disks.

A center-supported acoustic sensor system 20 according to the present invention includes both a displacement sensor 21 and an acceleration sensor 23 packaged in a single housing 22. The housing 22 is formed of a base 24 and a cover 26. The base 24 is formed generally as a circular plate having a flat bottom 28. A mounting post 30 extends from a central portion 32 where the base 24 is preferably thicker than at the edge 34. The mounting post 30 has a threaded central hole 36 in which a bolt 38 is mounted. The top portion 27 of the cover 26 has a threaded hole 29 arranged for receiving an end 39 of the bolt 38 when the sensor 20 is assembled.

The acoustic sensor system 20 preferably is neutrally buoyant. Neutral buoyancy is achieved by the combination of weight and volume. The weight may be adjusted by selecting the length of the bolt 38 to leave a void region 41 in the top portion 27 of the housing 22. Additional mass may be added in the residual volume remaining in either the threaded hole 29 or the threaded hole 36, after insertion of the bolt 38, to adjust the buoyancy of the sensor system 20.

The base 24 and cover 26 may be formed of any suitable material, such as plastics or metal, which will allow sufficient structural stiffness to ensure that structural resonance frequencies are far from the acoustic frequency range of interest. In the preferred embodiment, aluminum is used. The base 24 and cover 26 may be manufactured by any suitable means such as machining or casting. In the preferred embodiment they are machined from solid billets.

The acoustic sensor system 20 further includes a first flexural disk 40 that has a central passage 42 having a diameter sufficient to allow the bolt 38 to pass therethrough. A cylindrical ring 44 extends from the upper surface 46 of the flexural disk 40. The inner diameter of the cylindrical ring 44 is larger than the diameter of the mounting post 30. A cylindrical ring 48 extends from the lower surface 50 of the flexural disk 40. The portion of the first flexural disk between the mounting post 30 and the cylindrical rings 44 and 48 defines a first hinge 51 at which the first flexural disk 40 flexes in response to acceleration along the longitudinal axis of the mounting post 30. Threaded opening 31 of cover 26 engages with bolt 38 for attachment of cover 26 to base 24.

Figure 5A:
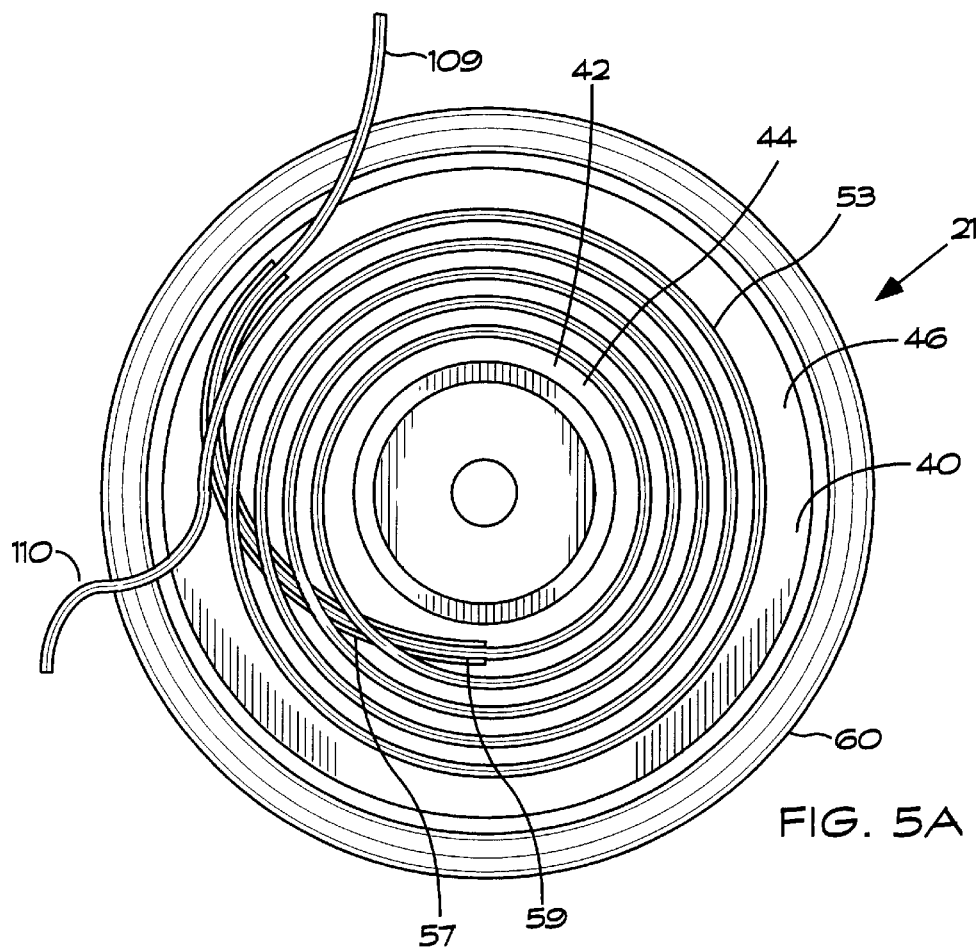
FIG. 5A is a plan view of the lower flexural disk of FIGS. 1 and 2 with a peripherally mounted inertial mass.

The spiral wound optical fiber coils 53 and 55 form portions of a pair of optical fibers 52 and 54, respectively, which are in turn attached to the surfaces 46 and 50, respectively, of the flexural disk 40. FIG. 5A is a plan view of the optical fiber coil 53 on the upper surface 46 of the first flexural disk 40. The optical fiber coil 55 and the lower surface 50 of the flexural disk 40 are essentially identical.

The first flexural disk 40 can be made from any suitable material which flexes under axial motion applied at its center thereby ensuring that the structural resonances of the flexural disk and wound fiber coils are outside the acoustic frequency band of interest. Suitable materials include plastics, such as polycarbonate (with or without filler materials), and metals, such as aluminum. The flexural disk may be fabricated by a number of different methods such as machining or casting.

Figure 2:
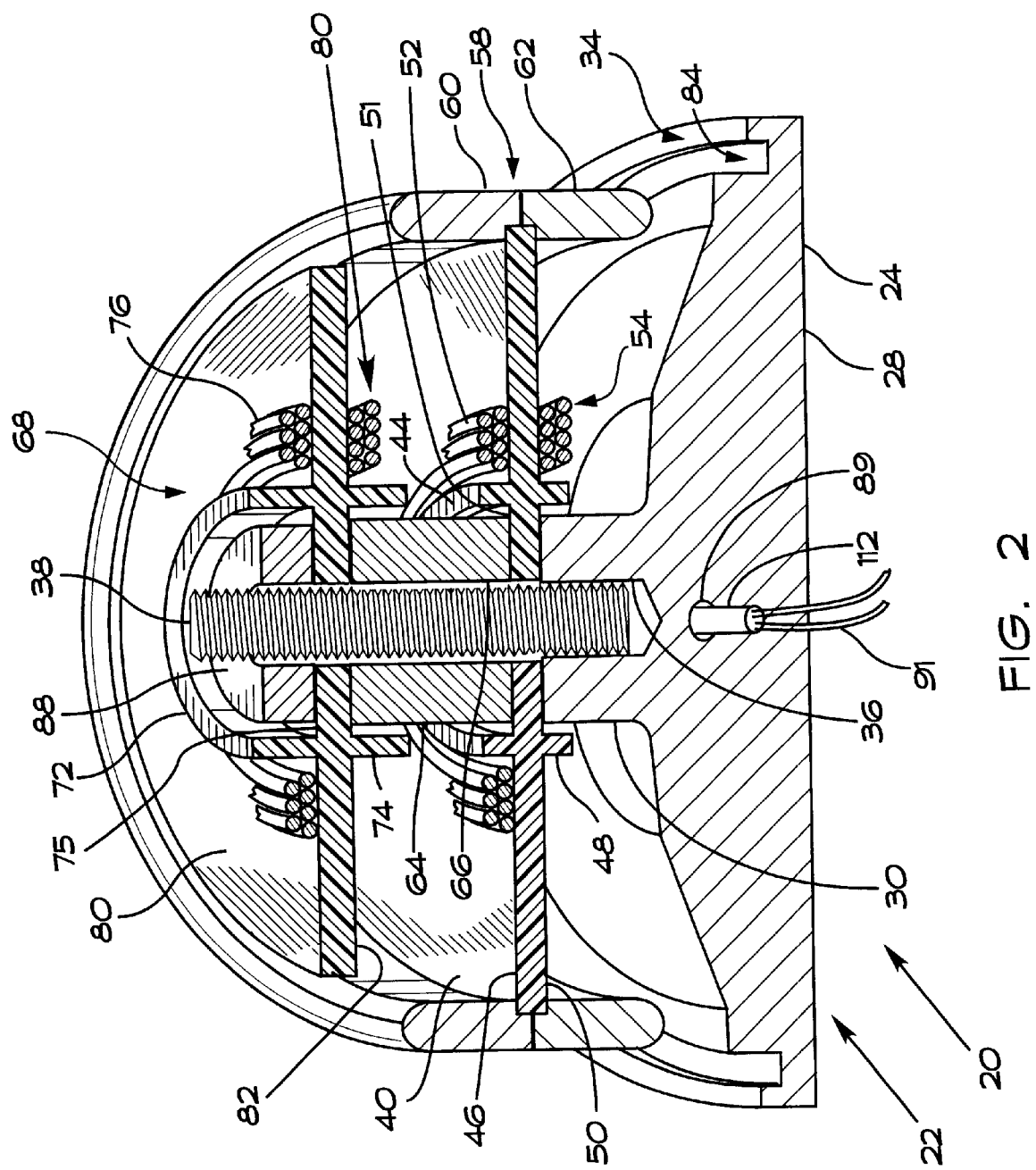
FIG. 2 is a partial cut away perspective view of the flexural disks of FIG. 1.
Figure 5B:
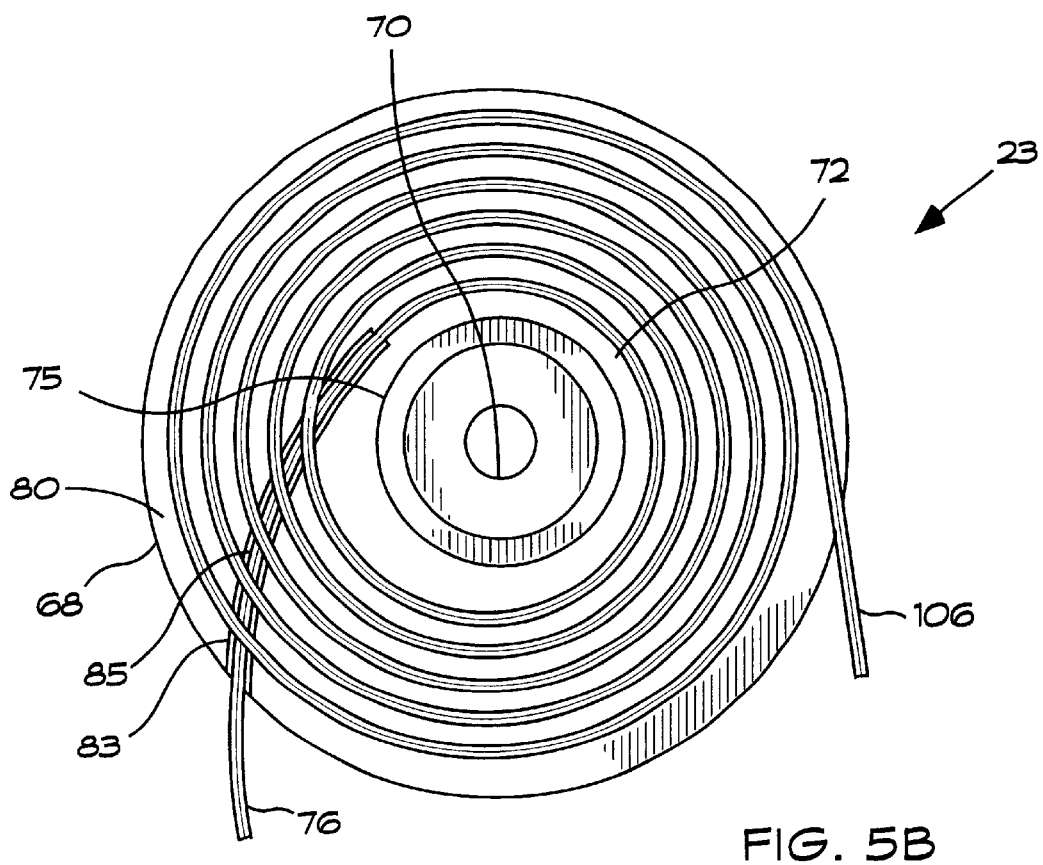
FIG. 5B is a plan view of the upper flexural disk of FIGS. 1 and 2.
Figure 9:
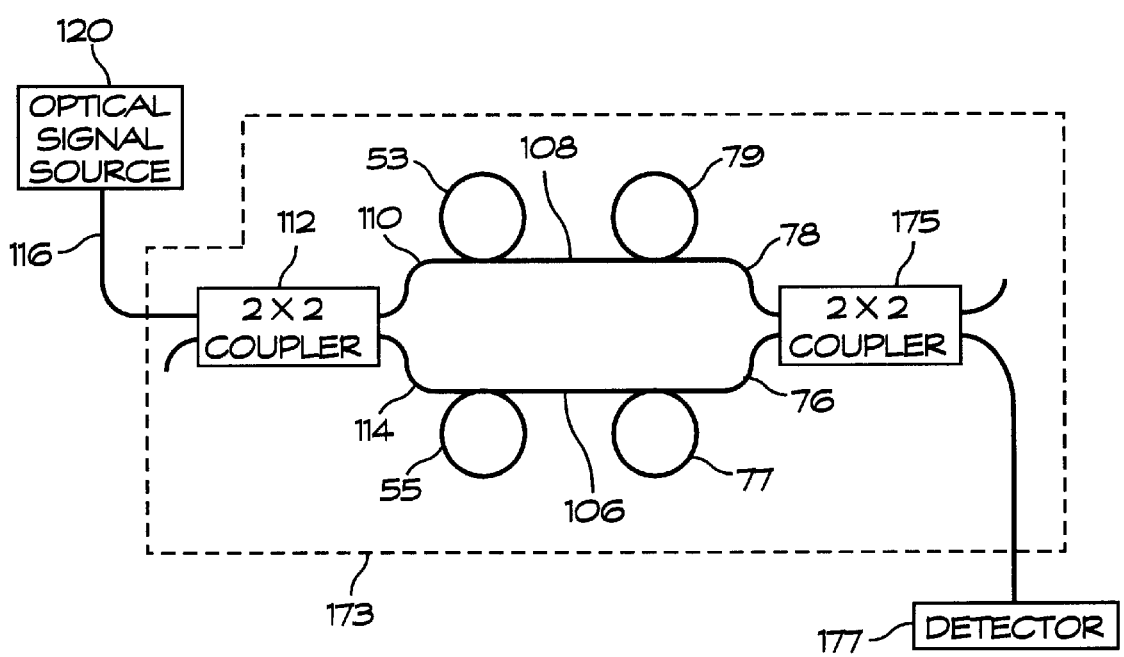
FIG. 9 illustrates an embodiment of the invention that includes a Mach-Zehnder interferometer.
Figure 10:
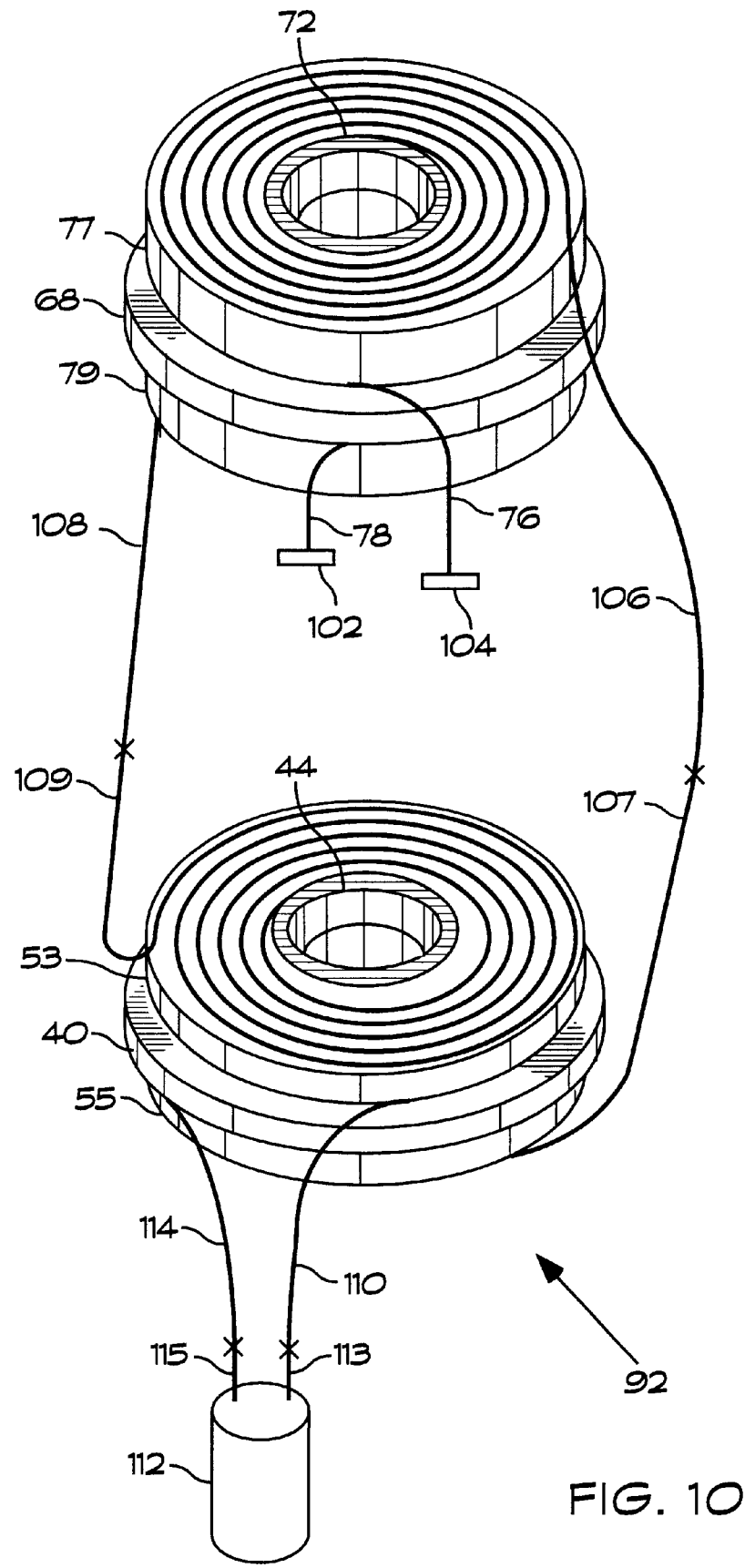
FIG. 10 is a perspective view illustrating fiber optic connections between the optical fiber coils mounted to the flexural disks to form an interferometer in the preferred embodiment.

In FIG. 1 the optical fiber coils 53 and 55 are indicated by rectangles having crossed diagonal lines. FIGS. 2, 5 and 10 show the essential features of the coils 53 and 55. The coil 53 for example is shown to be between the outer edge of the cylindrical ring 44 and the outer edge 56 of the flexural disk. Spiral-wound coils suitable for practicing the present invention are well-known in the art. See for example U.S. Pat. Nos. 5,903,349; 4,959,539; 5,317,929 and 5,883,308, the disclosures of which are incorporated by reference into the present disclosure.

Figures 3, 4:
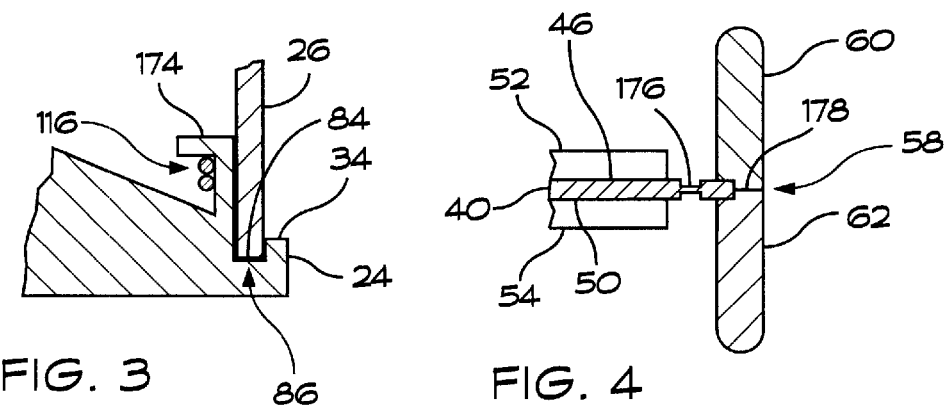
FIG. 3 is a cross sectional view of a portion of a fiber optic acoustic sensor according to the present invention showing a fiber retainer projection formed on a base upon which the flexural disks are mounted.
FIG. 4 is a cross sectional view of a second embodiment of a flexural disk that may be included in the present invention.

As shown in FIGS. 1, 2 and 4, an inertia ring 58 is mounted to the outer edge 56 of the first flexural disk 40. The inertial ring 58 preferably includes an upper half 60 and a lower half 62 that are bonded together after they are placed in contact around the outer edge 56 of the flexural disk 40. The inertia ring 58 and the compliance of the flexural disk retain the outer edge 56 of the flexural disk nearly stationary as the mounting post 30 moves along its longitudinal axis in response to an incident acoustic wave. This behavior serves to enhance the sensitivity of the sensor 21 to acoustic waves incident along the longitudinal axis of bolt 38. Referring to FIGS. 1 and 2, a cylindrical spacer 64 has a central passage 66 sized to allow passage of the bolt 38 therethrough. The spacer 64 is arranged to be between the first flexural disk 40 and a second flexural disk 68. The spacer 64 can be made from any suitable stiff material, such as metals. It serves the purpose of locating the second flexural disk 68. The second flexural disk 68 is similar in structure to the first flexural disk 40 and has a central passage 70, an upper cylindrical ring 72 and a lower cylindrical ring 74. The portion of the second flexural disk 68 between the cylindrical spacer 64, washer 88 and the cylindrical rings 72 and 74 defines a hinge 75 at which the second flexural disk 68 flexes in response to acceleration along the longitudinal axis of the mounting post 30.

A pair of optical fibers 76 and 78 are spiral wound to form optical fiber coils 77 and 79 on the upper and lower surfaces 80 and 82, respectively, of the second flexural disk 68.

The optical fiber coils 53, 55, 77 and 79 may be formed directly on their respective surfaces of the flexural disks 40 and 68. In this case, the rings 44, 48, 72 and 74 function as winding hubs for the optical fiber coils 53, 55, 77 and 79. Alternatively, the optical fiber coils 53, 55, 77 and 79 may be pre-formed and then adhesively bonded to the corresponding flexural disks.

As shown in FIGS. 1–3, there is a cylindrical groove 84 in the base 24 near the edge 34. The groove 84 has a thickness formed so that the lower edge 86 of the cover 26 may be placed in the groove 84. The groove 84 centers the cover 26 concentrically about base 24 and mounting post 30, and increases the surface area within the base 24 for adhesive bonding with the cover 26 for sealing sensor system 20. Assembly of the sensor 20 includes the steps of (a) inserting the bolt 38 in the threaded hole 36 in the mounting post 30, (b) placing the first flexural disk 40 on the mounting post 30 with the bolt extending through the passage 42, (c) placing the cylindrical spacer 64 on the first flexural disk 40 with the bolt 38 extending through the passage 66, (d) placing the second flexural disk 68 on the spacer 64 with the bolt 38 extending through the passage 70, (e) placing the washer 88 on the flexural disk 68 and around the bolt 38, (f) securing the components mentioned in steps (a)–(e) to the mounting post with a nut 90 and (g) securing the cover 26 to the base 24 via the bolt 38 and adhesive bonding between groove 84 and edge 86 of cover 26.

Use of the separate nut 90 to secure the flexural disks 40 and 68 to the bolt 38 and base 24 avoids problems encountered with prior art devices. The prior art devices use threaded engagement of a cover (not shown) with a bolt to secure flexural disks to a base. Using torque on the cover to hold the entire sensor assembly together causes sensitivity of the resonant behavior of the flexural disks dependent upon the torque applied between the cover and the base/disk because they are intimately coupled. Use of the nut 90 keeps the resonant behavior of the flexural disks 40 and 68 independent from the torque applied between cover 26 and the base 24.

Figure 6:
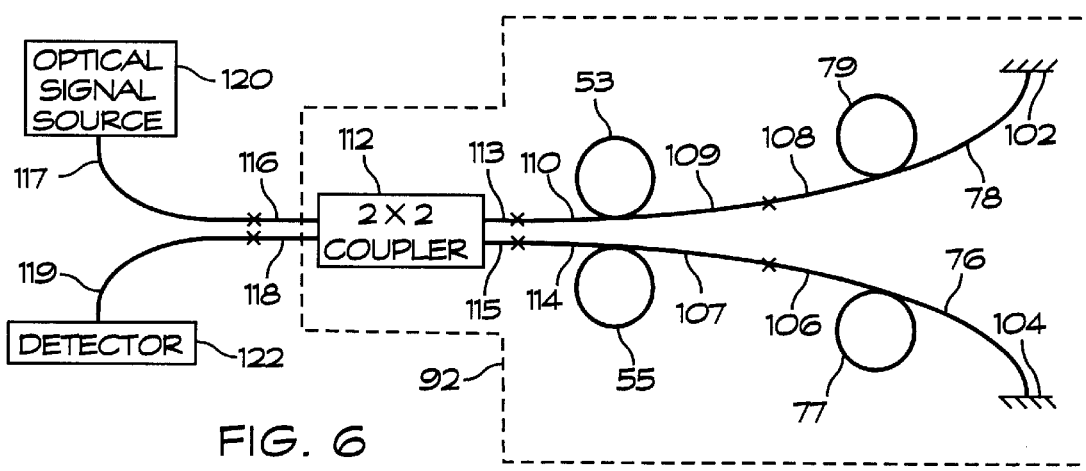
FIG. 6 schematically illustrates a configuration for a fiber optic Michelson interferometer that may be included in the sensor according to the present invention.

The optical fiber coils 53, 55, 77 and 79 may be connected together as shown in FIGS. 6 and 10 to form a Michelson interferometer 92 (FIG. 6). It should be noted that in FIGS. 6–10, splices between optical fibers are indicated by a pair of crossed lines. Mirrors 104 and 102 are formed at the ends of the optical fibers 76 and 78, respectively. An optical fiber lead 106 from the coil 77 is spliced to the optical fiber lead 107 from the coil 55. An optical fiber lead 114 extends from the coil 55 and is spliced to the optical fiber lead 115 that extends from the coupler 112. An optical fiber lead 108 from the coil 79 is spliced to the optical fiber lead 109 from the coil 53. An optical fiber lead 110 extends from the coil 53 and is spliced to an optical fiber lead 113 of an optical fiber coupler 112. Optical fiber leads 116 and 118 extend from the coupler 112 and are spliced to the optical fiber leads 117 and 119 of an optical signal source 120 and a detector 122, respectively. In the preferred embodiment, the coupler 112 is mounted in a machined through-hole in the base 24, as shown in FIG. 1 and FIG. 2. Application of adhesive tacks are sufficient to mount the coupler 112 securely to the base 24. For the optical signal source, any suitable long coherence length laser source on the order of ten meters may be used. Examples include Distributed FeedBack (DFB) lasers, laser diodes, fiber lasers, etc.

The coupler 112 divides optical signal from the optical signal source 120 between the optical fiber leads 113 and 115. Signals input to the lead 110 by the coupler 112 are input to the coils 53 and 79, and signals input to the lead 114 by the coupler 112 are input to the coils 55 and 77. The coils 53 and 79 are included in a first optical path and the coils 55 and 77 are included in a second optical path. The Michelson interferometer 92 produces optical intensity signals proportional to the phase difference between light waves that have propagated, round trip from the coupler 112 to the mirrors and back, along the two optical paths. This phase difference is proportional to the combined displacement of the flexural disk 40 and acceleration of the flexural disk 68.

Referring to FIGS. 5A and 10, when the coil 53 is wound directly on the flexural disk 40, a spiral-shaped groove 57 formed in the upper surface 46 is utilized. The groove 57, which extends between the inner and outer radii of the wound coil 53, is parallel to the upper surface 46 except near both ends of the groove 57, where it slopes upward to blend with the upper surface 46. A portion 59 of the optical fiber 52 is placed and adhesively bonded into the groove 57 before the winding process begins. After the coil 53 is wound, the portion 59 of the optical fiber 52 extends under the coil 53 toward the outer edge 56 of the disk 40. The groove 57 is used to ensure the fiber does not undergo microbend stress where the turns of fiber in the coil 53 pass over the exiting fiber lead 59. The fiber portion 59 is attached to the fiber lead 109 that is spliced to lead 108 of coil 79. A spiral groove 61 (not shown) similar to the spiral groove 57 is formed in the lower surface 50 of the flexural disk 40, and the coil 55 is formed in a manner similar to that described above for the coil 53.

When the optical fiber coils 77 and 79 are formed directly on the flexural disk 68, the surfaces 80 and 82 of the flexural disk 68 upon which the optical fiber coils 77 and 79, respectively, are wound, preferably have spiral grooves 83 and 84 respectively, of similar construction to spiral grooves 57 and 61. These grooves are designed to hold end portions of the optical fibers that are formed into the coils 77 and 79. For example, referring to FIG. 5B, a groove 83 is formed in the upper surface 80 of the flexural disk 68. Before the coil 77 is wound, portion 85 of the optical fiber 76 used to form the coil 77 is placed in the groove 83. After the winding is completed, the mirror 104 is added to the end of the optical fiber 76. Adding the mirrors 104 and 102 to fiber leads 76 and 78, respectively, can be accomplished by a number of methods, for example vacuum deposition of a reflective metal on the end of short fiber lengths, which can then be spliced to the leads 106 and 108. In the preferred embodiment, cleaved ends of the leads 106 and 108 are dip-coated with a Brashear silver mirroring solution. The lower surface 82 of the flexural disk 68 has a curved groove 84 (not shown) similar to the groove 83.

Figure 7:
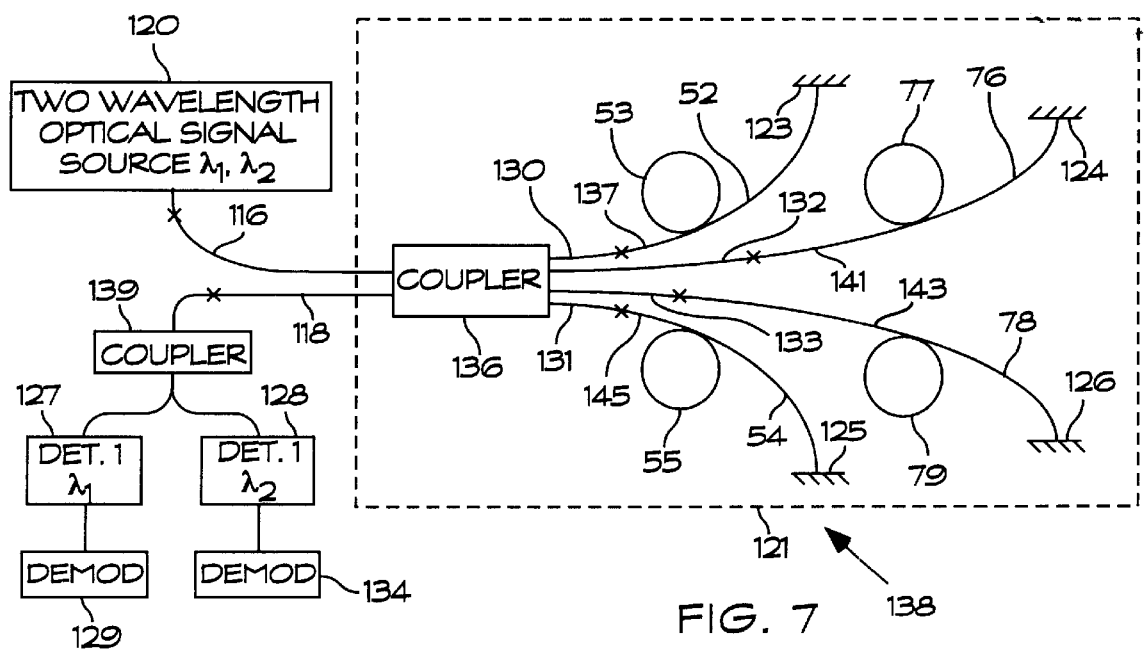
FIG. 7 schematically illustrates a first alternate configuration for a fiber optic Michelson interferometer that may be included in the sensor according to the present invention.
Figure 8:
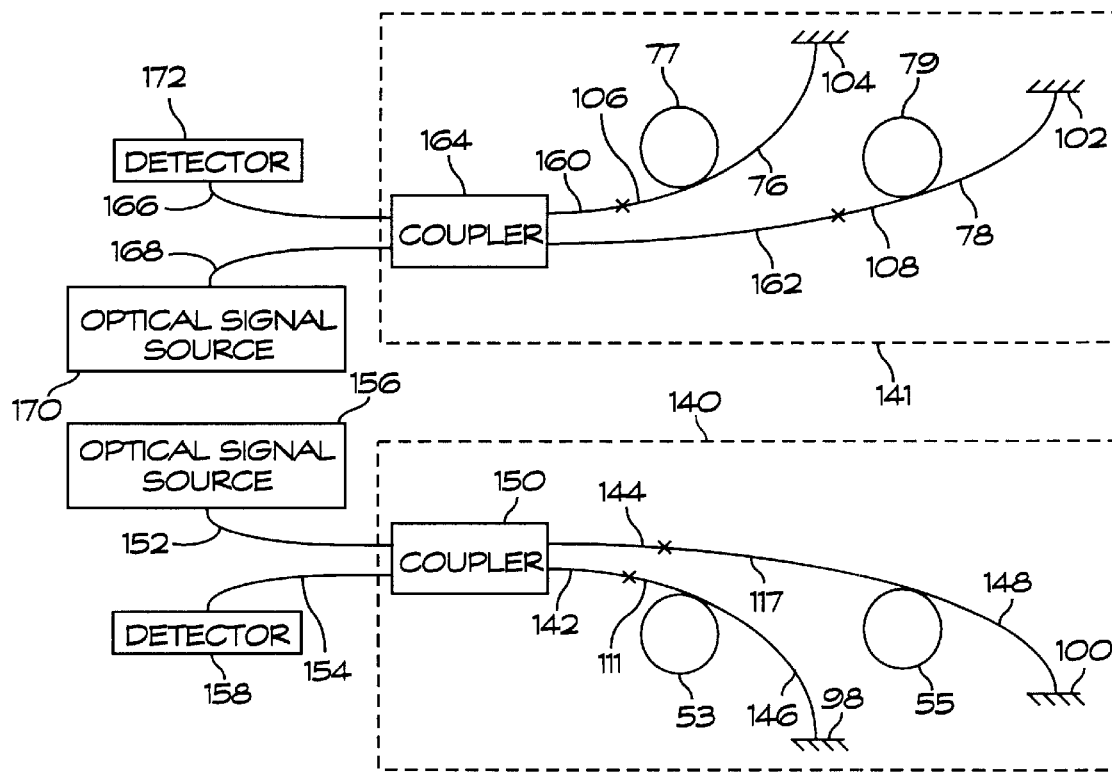
FIG. 8 schematically illustrates a second alternate configuration for a fiber optic Michelson interferometer configuration that may be included in the sensor according to the present invention.

Alternate optical architectures are shown in FIGS. 7 and 8. For example, FIG. 7 shows a wavelength-dependent embodiment. Instead of the broad band mirrors as shown in FIG. 6, the Michelson interferometer 121 of FIG. 7 has narrow band reflecting Bragg grating mirrors 123–126 near the ends of the fibers 52, 76, 54 and 78, respectively. Suitable Bragg grating mirrors are described in U.S. Pat. No. 4,986,624, the disclosure of which is hereby incorporated by reference into the present disclosure. In the embodiment of FIG. 7, one wavelength carries low acoustic frequency displacement information, while the other wavelength carries higher acoustic frequency acceleration information. This can be mechanized using a pair of 1×2 couplers concatenated into another 1×2 coupler, or by using a 2×4 coupler 136 which is simply a 4×4 coupler wherein two leads are terminated and unused.

Optical fiber leads 130–133 are connected between the optical coupler 136 and optical fiber leads 137, 145, 141 and 143 of optical fiber coils 53, 55, 77 and 79, respectively. The optical signal source 120 provides both optical signals of frequency $\lambda_1$ and $\lambda_2$ to the optical fiber lead 116, which then guides the optical signals to the optical coupler 136. The source signals divide between the four leads 130–133 for input to the respective coils 53, 55, 77 and 79. After traversing the coils 53, 55, 77 and 79, the signals are reflected by the Bragg grating mirrors 123, 125, 124 and 126, respectively, and propagate back through the respective coils. The coupler 136, which is preferably a 2×4 coupler, combines the optical signals from the four coils 53, 55, 77 and 79 coherently. Coils 53 and 55 work in concert together to create a Michelson interferometer at wavelength $\lambda_1$ while coils 77 and 79 work together in a like manner to create a Michelson interferometer at wavelength $\lambda_2$. The optical fiber lead 118 guides the combined optical signals to the wavelength division multiplexer 139 that separates wavelengths $\lambda_1$ and $\lambda_2$ that propagate respectively, to detectors 127 and 128. The electrical outputs from detectors 127 and 128 then are demodulated at demodulators 129 and 134. The resulting demodulated signals may be subsequently combined as required.

FIG. 8 shows a third optical architecture 138 in which the displacement sensor is configured with a Michelson interferometer 140 and the accelerometer is also configured as a Michelson interferometer 141. Both interferometers are enclosed in the same housing, similar to that shown in FIG. 1. Optical fiber leads 142 and 144 are connected between a 2×2 optical coupler 150 and optical fiber leads 111 and 117 of coils 53 and 55, respectively. Another pair of optical fiber leads 152 and 154 are connected between the optical coupler 150 and an optical signal source 156 and a detector 158. The remaining fiber leads 146 and 148 coming from coils 53 and 55 are connected to mirrors 98 and 100, respectively. Likewise, optical fiber leads 160 and 162 are connected between a 2×2 optical coupler 164 and optical fiber leads 106 and 108 of coils 77 and 79, respectively. Optical fiber leads 166 and 168 are connected between the optical coupler 164 and an optical signal source 170 and a detector 172, respectively. The remaining fiber leads 76 and 78 coming from coils 77 and 79 are connected to mirrors 104 and 102, respectively. The optical signal sources 156 and 170 can be one signal source, with an added 1×2 coupler to split the light for each sensor. In this embodiment, the acceleration and displacement signals are combined in the electronics following optical-to-electrical conversion by the detectors 158 and 172.

Any of the embodiments shown in FIGS. 6–8 could include a Mach-Zehnder interferometer configuration instead of a Michelson interferometer configuration. For example, referring to FIG. 9, a Mach-Zehnder interferometer 173 includes an optical coupler 175 arranged near the ends of the optical fibers 76 and 78 to couple and coherently recombine light traveling therethrough. The coupler 112 couples part of the source light into fiber 110 so that a first part of the source light passes through the coils 53 and 79 and a second part of the source light passes through fiber 114 to coils 55 and 77 before reaching the coupler 175. The coupler 175 coherently adds the optical phase shifts that have developed along the two optical paths as a result of an incident acoustic signal to produce an interference pattern. A detector 177 receives the optical output of the coupler 175 and produces electrical signals proportional to the optical phase difference between light waves that have followed the two optical paths. Whenever two couplers are to be used in the housing 22, the hole 89 in mounting base 24 is replaced with two parallel holes with one hole for each coupler 112 and 175. For simplicity, optical fiber leads of adjacent components in FIG. 7 have been combined, and optical fiber splices have been omitted.

Other features of the invention are shown in FIGS. 3 and 4. FIG. 3 illustrates a generally L-shaped projection 174 extending from the base 24 near the inner side of the groove 84. The projection 174 may be used to retain portions of lengths of optical fiber such as the optical fiber leads (116 for example) in selected positions inside the housing 22 and may be continuous or segmented along the circumference.

FIG. 4 illustrates a hinge 176 that may be included in the flexural disk 40. The hinge 176 is a reduced thickness portion near the outer edge 178 of the flexural disk 40. The hinge 176 increases the compliance of the flexural disk 40 so that as the sensor system moves along the axis defined by the bolt 38, the additional decoupling provided by the hinge 176 allows outer edge 178 of flexural disk 40 and the inertia ring 58 to remain nearly stationary. This enhances the motion of the central portion of the flexural disk related to the amplitude of the incident acoustic waves thereby maximizing the sensitivity of the sensor.

Figure 11A:
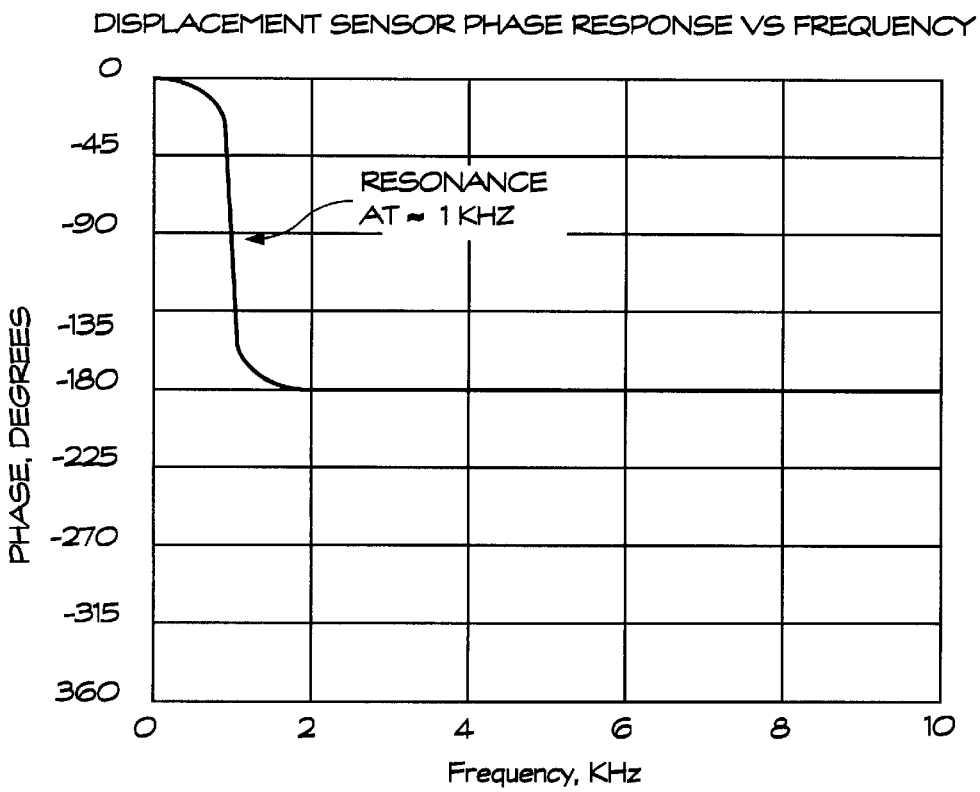
FIG. 11a shows the individual phase response of the displacement sensor alone as a function of frequency.
Figure 11B:
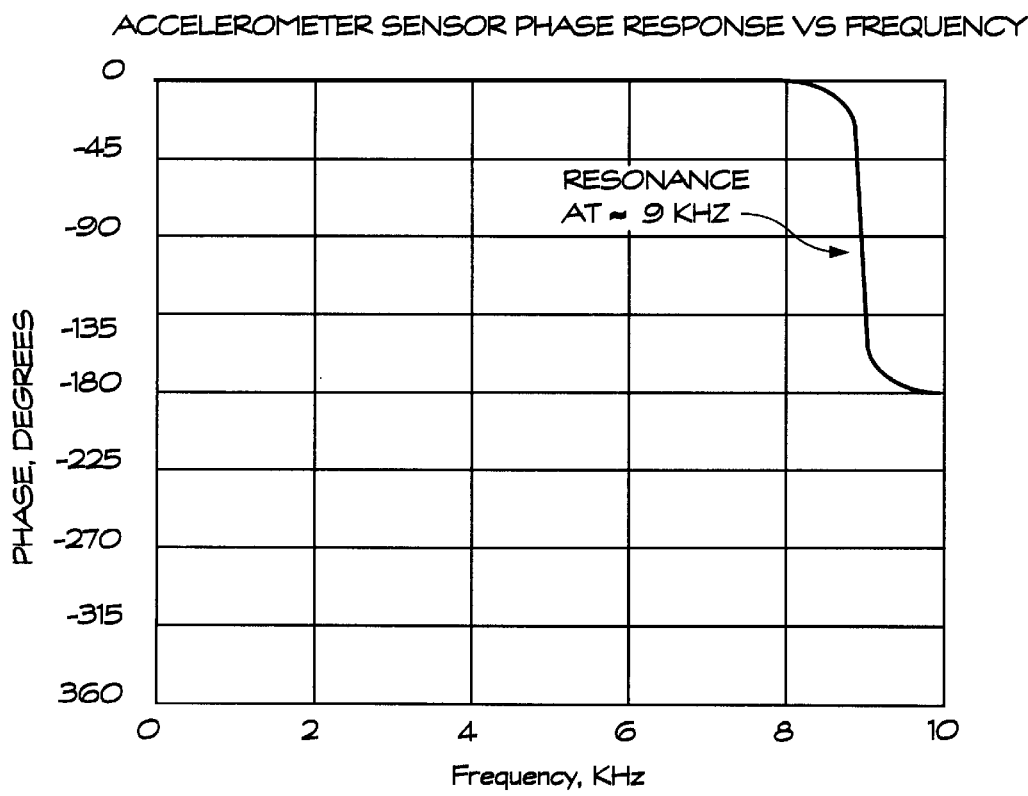
FIG. 11b shows the corresponding individual phase response of the accelerometer sensor alone as a function of frequency.
Figure 11C:
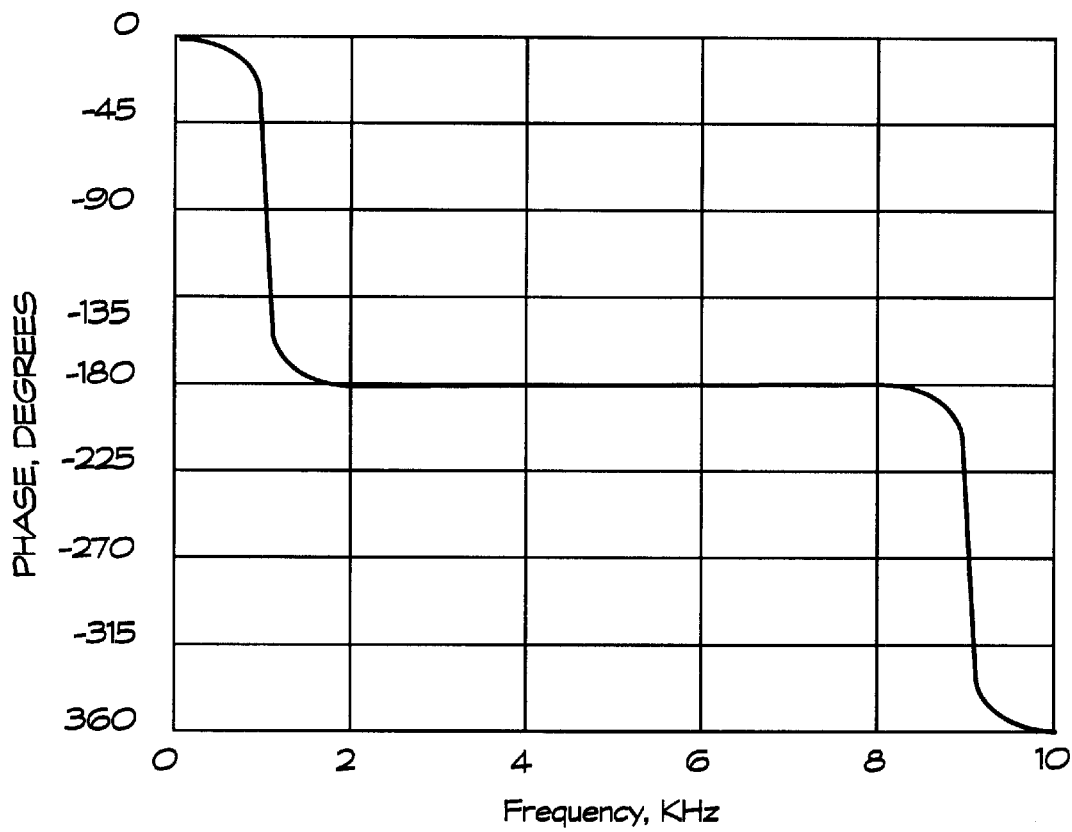
FIG. 11c shows the total phase response of the combined sensor as a function of frequency.

FIG. 11(a) shows the phase response of only the displacement sensor to an input motion along the axis of bolt 38. FIG. 11(b) shows the phase response of only the accelerometer sensor to the same motion. FIG. 11(c) shows the combined phase response of the sensor system to the input motion.

Figure 11D:
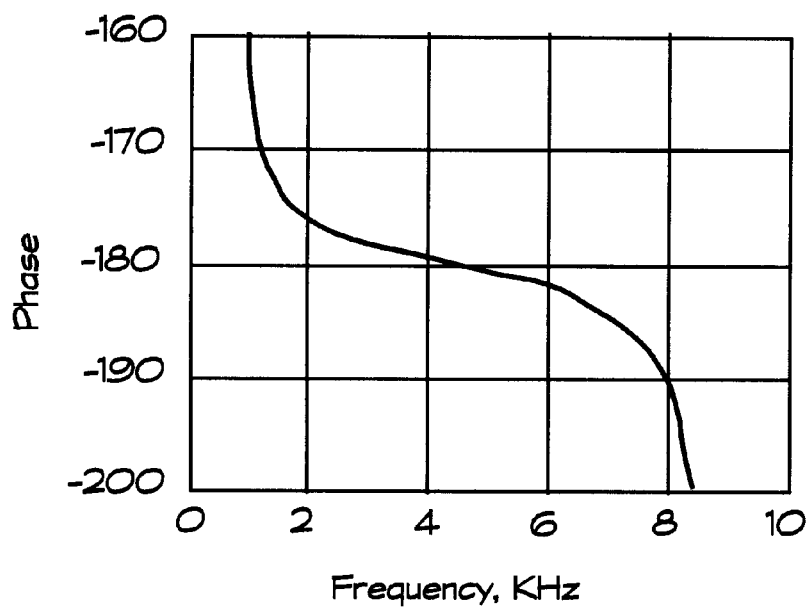
FIG. 11d shows a close-up view of the combined sensor phase response in the crossover region.

FIG. 11(d) graphically illustrates an expanded view of the phase response of the acoustic sensor system 20 near the −180° crossover region. The phase response of the composite sensor 20 is nearly flat between 2000 Hz and 7000 Hz. The variation of the phase in this range is only about 10°.

Figure 12:
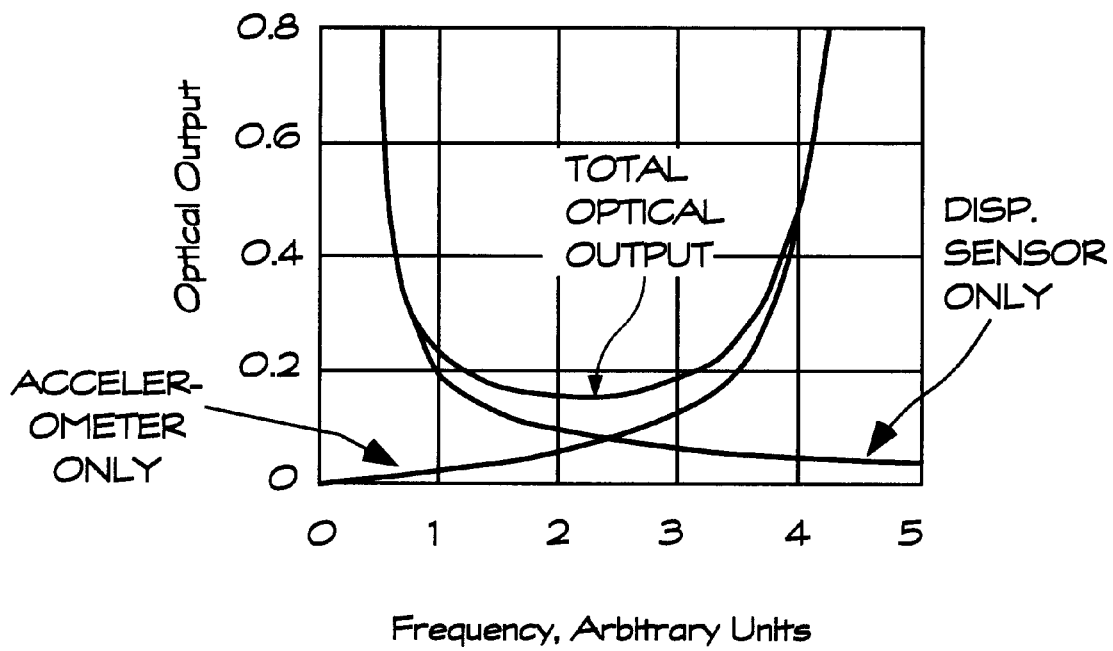
FIG. 12 graphically illustrates the optical output signal divided by the input velocity as a function of frequency for an acoustic sensor system according to the present invention.

FIG. 12 graphically illustrates the acoustic sensitivity of the acoustic sensor system 20, that is, optical output signal (proportional to the composite optical phase difference between the two interferometer arms) divided by the input motion as a function of frequency.

The present invention overcomes the problems of previous sensors by exploiting the benefits of each within a single sensor system in a single package. The flexural disk 68 and its fiber coils 77 and 79 have a collective high natural frequency, and are sensitive to acceleration along the length of the bolt 28 below their resonance frequency. In this frequency range, as the housing 22 moves axially, the edge of the disk 68 lags behind due to its inertial mass. The resulting lag in motion causes the disk 68 to flex, causing the fiber coils 77 and 79 to stretch/compress contrary to each other to alter the optical path length of each coil. As part of an interferometer, the fiber coils 77 and 79 transmit an optical phase change in the optical waves propagating through each coil (one in each interferometer leg) to create an acceleration-dependent intensity change at the coupler 112.

Likewise, the flexural disk 40 has a very low natural frequency by virtue of a very compliant flexural disk and relatively heavy edge-mounted inertial mass. This configuration is designed to cause changes in the optical phase changes in its coils 53 and 55 above its resonance that manifest as displacement-dependent intensity changes at the coupler 112. Mechanical damping can be used to tailor the sensor response near resonances if, needed.

Source and detection electro-optics are connected to the opposite end of the coupler 112. A telemetry system (not shown) can be placed between the sensor 20 and the source/detection electro-optics for the purpose of remote sensing and multiplexing of many sensors on a few optical fiber trunks. At the demodulation electronics, a linearizing filter (not shown) can be employed to compensate for variations in the sensor's response versus frequency.

Combining the displacement sensor 21 and acceleration sensor 23 into a single device with a single or paired Michelson interferometer creates a particle motion sensor 20 with a high gain-bandwidth product. The sensor 20 is suitable for applications such as planar marine arrays, line marine arrays, land seismic arrays, etc. Because of the significantly relaxed bandwidth requirements on both of the sub-sensors 21 and 23, this composite sensor 20 can potentially yield a high sensitivity with very large bandwidth, with the potential for small size and cost savings over prior art.

Figure 13:
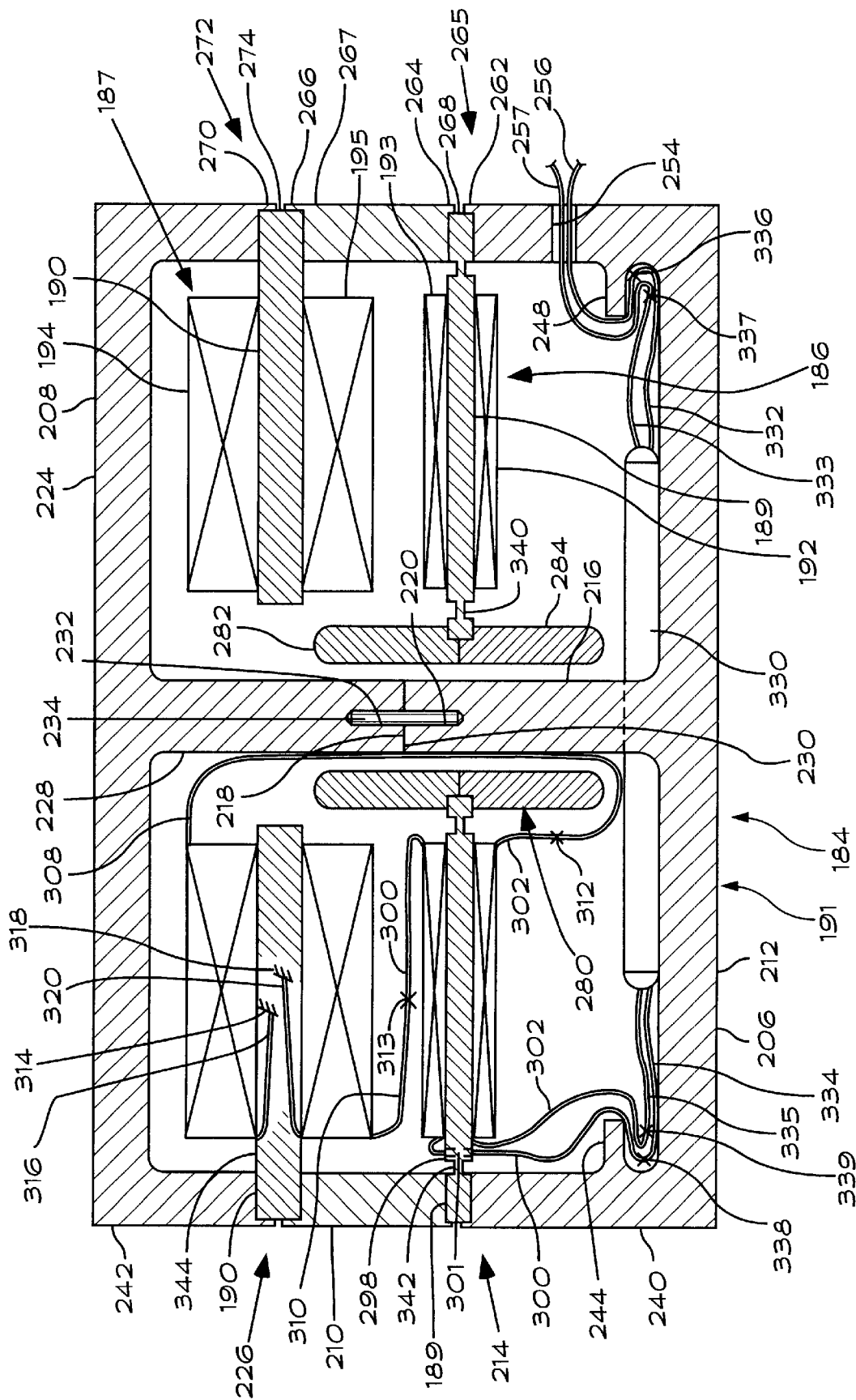
FIG. 13 is a cross sectional view of an edge-supported embodiment of the invention in contrast with FIG. 1.

FIG. 13 is a cross sectional view of an alternate edge-supported embodiment of a Michelson interferometric acoustic sensor system 184 that includes a displacement sensor 186 and an acceleration sensor 187 in which the outer edges of a pair of flexural disks 189 and 190 are mounted directly to a housing 191. A pair of optical fiber coils 192 and 193 are connected to the flexural disk 189 in the same manner as described with reference to FIGS. 1 and 2. In like manner, a pair of optical fiber coils 194 and 195 are connected to the flexural disk 190.

The displacement sensor flexural disk 189 is designed with both an inner hinge 340 and an outer hinge 342 whose design is similar to hinges 176 and 51 shown in FIG. 1 and FIG. 4 and whose function is identical to that which was described above. Similarly, the accelerometer flexural disk 190 has effectively a similar hinge 344 that is formed by the spacing between coils 194 and 195 and housing walls 242 and spacer ring 210 respectively. Hinge 344 functions identically to hinge 75 shown in FIG. 1 as described above.

The housing 191 includes a lower housing 206, an upper housing 208 and a housing spacer ring 210. The lower housing 206 and the upper housing 208 preferably have nearly identical shapes. Therefore, except as noted, structural features corresponding to those described in relation to the lower housing 206 exist in the upper housing 208.

The lower housing 206 is formed generally as a cylinder having a closed end 212 and an open end 214. A center post 216 extends away from the center of the closed end 212. An end 218 of the center post 216 includes a central cylindrical recess 220.

The upper housing 208 has a closed end 224 and an open end 226. A center post 228 extends away from the closed end 224. An end 230 of the center post 228 includes a central recess 232 that is axially aligned with the recess 220 when the sensor 184 is assembled.

When the sensor 184 is assembled, the center posts 216 and 228 are placed end-to-end with a press-fit dowel pin 234 extending into the recesses 220 and 232. An adhesive such as epoxy is also used to secure the end faces 218 and 230 together.

The center posts 216 and 228 have lengths greater than the lengths of the cylindrical sides 240 and 242 of the lower and upper housings 206 and 208, respectively. The cylindrical housing spacer ring 210 fills the gap between the ends 214 and 226 of the lower and upper housings 206 and 208, respectively.

Referring to FIGS. 13 and 14, a plurality of inwardly facing fiber retaining fingers 244–251 are preferably spaced about 45° apart around the inner surface 243 of the lower housing 206. These fingers 244–251 are used to secure and retain optical fibers routed inside the housing 206.

The lower housing also preferably includes a fiber exit hole 254 a small distance above the finger 248 as shown in FIG. 13. A pair of optical fibers 256 and 257 extend through the exit hole 254. Exit hole 254 may be filled with adhesive during assembly to form a fluid seal.

Referring to FIGS. 13–17, the open end 214 of the lower housing 206 preferably includes an extended outer rim 262. The housing spacer 210 includes an extended outer rim 264 at its lower edge 265 and an extended outer rim 266 at its upper edge 267. When the sensor 184 is assembled, an edge portion 268 of the flexural disk 189 extends between a portion of the upper end 214 of the lower housing 206 and a portion of the lower end of the spacer 210. The outer edge of the flexural disk 189 preferably abuts the inner edges of the extended outer rims 264 and 266. A suitable adhesive such as epoxy is used to bond the edge portion 268 of the flexural disk 189 to the upper end 214 of the lower housing 206 and to the lower end 265 of the spacer 210.

The upper housing 208 has an extended rim 270 at its lower end 272. When the sensor 184 is assembled, an outer edge portion 274 of the flexural disk 190 extends between a portion of the lower end 272 of the upper housing 208 and a portion of the upper end of the spacer 210. The outer edge 276 of the flexural disk 190 preferably abuts the extended rims 266 and 270, and an adhesive is used to bond them together in the same manner as described above.

Referring to FIGS. 13 and 18, a generally cylindrical proof mass, or inertia ring, 280 is mounted to the inner edge of the flexural disk 189. The proof mass 280 may be formed to be similar to the inertia ring 58 described above and is preferably formed of a pair of upper and lower rings 282 and 284, respectively. The upper and lower rings have circular notches 285 and 286 at their end edges 287 and 288, respectively. Mounting the flexural disk 189 and the proof mass 280 together includes precoating the contact surfaces of inner edge 290 of the flexural disk 189 and proof mass notches 285 and 286 with a suitable adhesive such as epoxy. The notched surfaces 285 and 286 are then pressed onto the inner edge portion 290 of the flexural disk 189 and held in place until the adhesive fully cures.

A pair of optical fibers 300 and 302 are used to form the coils 193 and 192 on the flexural disk 189 in the manner described with reference to FIGS. 1 and 2 to form the displacement sensor 186. A portion of optical fiber 300 passes through a feedthrough slot 298 to connect to upper coil 193. A second pair of optical fibers 308 and 310 are used to form coils 194 and 195 on the flexural disk 190 to form the acceleration sensor 187. A portion of the optical fiber 308 is routed through the center of the proof mass 280 and connected to an end of the optical fiber 302 via a splice 312. Similarly, a portion of optical fiber 310 is connected to a portion of optical fiber 300 via splice 313. A mirror 314 is formed at an end 316 of the optical fiber 308, and a mirror 318 is formed at an end 320 of the optical fiber 310.

A 2×2 fiber optic coupler 330 is mounted in the housing 191 as shown in FIGS. 13 and 14, preferably near the side wall 243 of the lower housing 206. The coupler 330 has optical fiber leads 332–335 extending therefrom. The leads 332 and 333 are connected to the optical fibers 256 and 257, respectively, by splices 336 and 337, respectively. The leads 334 and 335 are connected to the optical fibers 300 and 302, respectively, via splices 338 and 339, respectively.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. An acoustic sensor system for measuring parameters of acoustic waves in a selected frequency range, comprising:
    a support member;
    a displacement sensor mounted to the support member, the displacement sensor including:
        a first flexural disk, the first flexural disk having a first natural frequency that is less than the selected frequency range of the acoustic waves;
        a first upper spiral-wound optical fiber coil connected to the upper side of the first flexural disk;
        a first lower spiral-wound optical fiber coil connected to the lower side of the first flexural disk;
    an acceleration sensor mounted to the support member, the acceleration sensor including:
        a second flexural disk, the second flexural disk having a second natural frequency that is greater than the frequency range of the acoustic waves;
        a second upper spiral-wound optical fiber coil connected to the upper side of the second flexural disk;
        a second lower spiral-wound optical fiber coil connected to the lower side of the second flexural disk; and
    a fiber optic interferometer system arranged to provide an output signal that is a combination of signals output from the displacement sensor and the acceleration sensor.

2. The apparatus of claim 1, further comprising an inertia ring mounted to an edge of the first flexural disk to retain the edge of the first flexural disk stationary with respect to inertial space when an acoustic wave in the selected frequency range is incident upon the housing.

3. The apparatus of claim 2, further comprising an inertia ring mounted to an edge of the first flexural disk to retain the edge of the first flexural disk stationary with respect to inertial space when an acoustic wave in the selected frequency range is incident upon the housing.

4. The apparatus of claim 1 wherein the support member includes a base and a bolt extending from the base.

5. The apparatus of claim 4 further including:
    central passages formed in the first and second flexural disks such that the first and second flexural disks may be mounted on the bolt;
    a cylindrical spacer mounted on the bolt between the first and second flexural disks;
    a cover, nut and washer placed on the bolt to secure the first and second flexural disks to the base with a torque independent of the torque used to attach the cover to the bolt and the base.

6. The apparatus of claim 1 wherein the interferometer system comprises:
    a first leg that includes a series combination of the first upper spiral-wound coil and the second lower spiral-wound coil;
    a second leg that includes a series combination of the second upper spiral-wound coil and the first lower spiral-wound coil; and
    an optical coupler arranged to couple optical signals between the first and second legs.

7. The apparatus of claim 6 wherein the interferometer system comprises a Michelson interferometer.

8. The apparatus of claim 6 wherein the interferometer system comprises a Mach-Zehnder interferometer.

9. The apparatus of claim 1 wherein the interferometer system comprises:
    a two wavelength optical signal source; and
    an optical coupler utilized to receive optical signals output from the optical signal source and to couple the optical signals into each of the first and second upper optical fiber coils and the first and second lower optical fiber coils, the optical coupler being further utilized to combine optical signals from the first and second upper optical fiber coils and the first and second lower optical fiber coils, such that interference between optical signals of a first one of the two wavelengths indicates displacement of the sensor system and the other wavelength indicates acceleration of the sensor system.

10. The apparatus of claim 9 further comprising a narrow band reflection Bragg grating created near an end of each of the optical fiber coils to function as narrow wavelength range mirrors.

11. The apparatus of claim 1 wherein each of the first and second flexural disks includes an upper winding hub and a lower winding hub spaced apart from the support post so that the optical fiber coils may be formed directly on the first and second flexural disks.

12. The apparatus of claim 11 wherein portions of the first and second flexural disks adjacent to and inside the corresponding upper and lower rings define hinges at which the flexural rings flex in response to acceleration of the support member along its longitudinal axis.

13. The apparatus of claim 12 wherein the outer diameter surfaces of the upper and lower rings provide a bonding surface for fiber attachment that provides an increased strain within the optical fiber coils.

14. The apparatus of claim 12 wherein the upper surfaces of the first and second flexural disks include corresponding grooves extending between the upper rings and the outer edges of the flexural disks and the lower surfaces of the first and second flexural disks include corresponding grooves extending between the lower rings and the outer edges of the flexural disks, the grooves being arranged to allow lengths of optical fiber to pass under the optical fiber coils that are formed on the surfaces of the flexural disks without imparting microbend stresses.

15. The apparatus of claim 1 wherein the first and second flexural disks have corresponding central passages that define inner edges of the first and second flexural disks that are mounted to the support member.

16. The apparatus of claim 1 further comprising a fluid-tight housing arranged to contain the displacement sensor and the acceleration sensor.

17. The apparatus of claim 16 wherein an outer edge portion of the first flexural disk is mounted to the housing and an outer edge portion of the second flexural disk is mounted to the housing.

18. The apparatus of claim 16 wherein the housing comprises:

a lower housing formed generally as a cylinder having a side wall, a closed end and an open end, an extended outer rim extending around an outer portion of the open end to define a lower housing notch between the inner surface of the side wall and the inner edge of the rim;

a lower central mounting post extending from the closed end of the lower housing;

an upper housing formed generally as a cylinder having a side wall, a closed end and an open end, an extended outer rim extending around an outer portion of the open end to define an upper housing notch between the inner surface of the side wall and the inner edge of the rim;

an upper central mounting post extending from the closed end of the upper housing;

a spacer formed generally as a cylinder open at both ends, the spacer including a lower spacer rim that defines a lower spacer notch and an upper spacer rim that defines an upper spacer notch such that when the housing is assembled, the lower housing notch and the lower spacer notch define a first groove inside the housing and the upper housing notch and the upper spacer notch define an second groove inside the housing;

an outer edge portion of the first flexural disk formed to fit within the first groove; and an outer edge portion of the second flexural disk formed to fit within the second groove.

19. The apparatus of claim 18 wherein the first flexural disk has a central passage that defines an inner edge of the first flexural disk and wherein a proof mass or inertia ring is mounted to the inner edge of the first flexural disk.

20. The apparatus of claim 19 wherein the first flexural disk has a reduced thickness portion that defines a hinge adjacent the inertia ring.

21. The apparatus of claim 19 wherein the first flexural disk has a hinge adjacent the housing.

22. The apparatus of claim 18 wherein the second flexural disk has a hinge adjacent the housing that is effectively formed by the space between the wound fiber coil and the housing wall.

23. The apparatus of claim 16 wherein the housing includes a projection that extends inward from a sidewall portion, the projection being arranged to facilitate routing optical fibers in the housing.

24. The apparatus of claim 16 wherein the housing includes an inwardly facing step and wherein outer edge portions of the first and second flexural disks fits within the step to mount the first and second flexural disks to the housing.

25. The apparatus of claim 17 wherein the first flexural disk includes a fiber routing passage therethrough.

* * * * *